(12) United States Patent
Ogawa

(10) Patent No.: US 11,970,054 B2
(45) Date of Patent: Apr. 30, 2024

(54) POWER STORAGE DEVICE

(71) Applicant: TOYOTA JIDOSHA KABUSHIKI KAISHA, Toyota (JP)

(72) Inventor: Naohito Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 17/556,741

(22) Filed: Dec. 20, 2021

(65) Prior Publication Data
US 2022/0234432 A1 Jul. 28, 2022

(30) Foreign Application Priority Data
Jan. 28, 2021 (JP) ................................ 2021-011926

(51) Int. Cl.
*B60K 1/04* (2019.01)
*H01M 50/242* (2021.01)
*H01M 50/249* (2021.01)

(52) U.S. Cl.
CPC ............ *B60K 1/04* (2013.01); *H01M 50/242* (2021.01); *H01M 50/249* (2021.01); *B60K 2001/0438* (2013.01)

(58) Field of Classification Search
CPC ............. B60K 1/04; B60K 2001/0438; H01M 50/249; H01M 50/242
See application file for complete search history.

(56) References Cited

U.S. PATENT DOCUMENTS

| | | | | |
|---|---|---|---|---|
| 2018/0105209 A1* | 4/2018 | Fees | ..................... | H01M 50/249 |
| 2019/0315408 A1* | 10/2019 | Fees | ..................... | B62D 21/07 |
| 2021/0339617 A1* | 11/2021 | Ohkuma | ............. | H01M 50/242 |

FOREIGN PATENT DOCUMENTS

| | | |
|---|---|---|
| JP | 2014-193692 A | 10/2014 |
| JP | 2019-117688 A | 7/2019 |

* cited by examiner

*Primary Examiner* — James A Shriver, II
*Assistant Examiner* — Nicholas R. Kandas
(74) *Attorney, Agent, or Firm* — Oliff PLC

(57) ABSTRACT

The power storage module is housed in the first housing. The electronic device is housed in the second housing. The protection unit protects the second housing. The protection unit is disposed to overlap with the second housing in a second direction orthogonal to a first direction in which the first housing and the second housing are arranged side by side. The protection unit includes a load receiving member, a pair of load transmitting members, and a reinforcing member. The pair of load transmitting members is disposed to face each other in a third direction orthogonal to the first direction and the second direction in such a manner that a distance between the pair of load transmitting members increases from the load receiving member toward the first housing.

7 Claims, 2 Drawing Sheets

POWER STORAGE DEVICE

This non-provisional application is based on Japanese Patent Application No. 2021-011926 filed on Jan. 28, 2021 with the Japan Patent Office, the entire contents of which are hereby incorporated by reference.

BACKGROUND

Field

The present disclosure relates to a power storage device mounted on a vehicle.

Description of the Background Art

Japanese Patent Laying-Open No. 2014-193692 discloses a conventional power storage device in which a junction box is disposed at a positon behind a housing case that houses a power storage module. The housing case is disposed below the floor panel, and the junction box is disposed above the floor panel at a positon behind the housing case. The junction box is disposed on a cross member that extends between a pair of rear wheel houses. A rear side member protrudes rearward from the cross member.

In the power storage device disclosed in Japanese Patent Laying-Open No. 2014-193692, when the vehicle encounters a rear end collision, the floor panel and the rear side member undergo a bending deformation by rotating upward about a rear portion of the cross member. Thereby, it is possible to reduce an impact force applied to the junction box disposed on the cross member.

SUMMARY

Unlike the power storage device disclosed in Japanese Patent Laying-Open No. 2014-193692, depending on the structure of a vehicle, the installation area of a junction box and the installation area of a housing case may not be partitioned by the floor panel. In this case, in order to protect the junction box, the junction box is generally disposed in a robust housing case.

However, if the junction box is disposed adjacent to the power storage module in the housing case, the length of the housing case becomes longer. In this case, as compared with the case where the junction box is disposed adjacent to the housing case, the length of the entire power storage device becomes greater. If the length of the housing case becomes greater, in order to ensure sufficient buckling strength or the like, the cross section of the housing case becomes greater by the power of ⅔ or the power of 2 in accordance with the length.

Further, when a reinforcing member is disposed at a central position of the housing case so as to reinforce the housing case, in order to prevent the power storage module from interfering with the reinforcing member, the power storage module is divided into a plurality of components and disposed in the housing case, which makes the total size of the components and the housing case greater.

The present disclosure has been made in view of the aforementioned problems, and an object of the present disclosure is to provide a power storage device having a reduced size while preventing an impact force from being transmitted to a power storage module and an electronic device.

The power storage device according to an embodiment of the present disclosure includes a power storage module, a first housing that houses therein the power storage module, an electronic device, a second housing that is arranged side by side with the first housing and houses therein the electronic device, and a protection unit that protects the second housing. The protection unit is disposed to overlap with the second housing in a second direction orthogonal to a first direction in which the first housing and the second housing are arranged side by side. The protection unit includes a load receiving member that receives a load applied from the first direction, a pair of load transmitting members connected between the load receiving member and the first housing so as to transmit the load applied to the load receiving member to the first housing, and a reinforcing member that reinforces the pair of load transmitting members. The pair of load transmitting members is disposed to face each other in a third direction orthogonal to the first direction and the second direction in such a manner that a distance between the pair of load transmitting members increases from the load receiving member toward the first housing.

According to the configuration mentioned above, the first housing and the second housing are arranged side by side. Therefore, as compared with the case where the second housing and the power storage module are arranged side by side inside the first housing, it is possible to reduce the physical size of the power storage device. In addition, since the protection unit is disposed to overlap with the second housing in the second direction, it is possible to reduce the installation space of the protection unit and the physical size of the power storage device.

Further, when an impact force is applied from the first direction in which the first housing and the second housing are arranged side by side, the impact force is applied to the impact force receiving member of the protection unit. The impact force applied to the impact force receiving member is transmitted to the first housing by the pair of impact force transmitting members. In the present disclosure, the pair of impact force transmitting members is reinforced by the reinforcing member. Thus, the pair of impact force transmitting members is prevented from being damaged by the impact force. Therefore, it is possible for the pair of impact force transmitting members to transmit the impact force to the first housing while preventing the impact force from being transmitted to the second housing. Accordingly, it is possible to prevent the impact force from being transmitted to the electronic device housed in the second housing.

In addition, since the pair of impact force transmitting members is disposed in such a manner that the distance between the pair of impact force transmitting members increases toward the first housing, the impact force is transmitted to both end portions of the first housing instead of the central portion thereof in the third direction. Since the impact force is transmitted to both end portions of the first housing having higher rigidity, the first housing is prevented from being deformed, which makes it possible to prevent the impact force from being transmitted to the power storage module.

In the power storage device according to the present disclosure, it is preferable that when viewed from the second direction, the load receiving member is disposed to protrude from the second housing in the first direction.

According to the configuration mentioned above, when an impact force is applied from the first direction, the impact force is more reliably applied to the impact force receiving member.

In the power storage device according to the present disclosure, it is preferable that the first housing includes a side surface facing the second housing in the first direction, and each of the pair of load transmitting members is connected to a corresponding one of both end portions of the side surface in the third direction.

According to the configuration mentioned above, since both end portions of the side surface are located nearby corners of the first housing, the rigidity of both end portions of the side surface is higher than that of the central portion of the side surface. Since the impact force is transmitted to both end portions of the side surface by the pair of load transmitting members, the first housing is less likely to be damaged.

In the power storage device according to the present disclosure, it is preferable that when viewed from the second direction, a connection portion of each of the pair of load transmitting members connected to a corresponding one of both end portions of the side surface is located outside the power storage module.

According to the configuration mentioned above, since the impact force is applied to the side surface located outside the power storage module, even if the side surface is deformed, it is possible to prevent the side surface from coming into contact with the power storage module, which makes it possible to prevent the impact force from being transmitted to the power storage module.

In the power storage device of the present disclosure, the reinforcing member includes a connection member to connect the pair of load transmitting members.

According to the configuration mentioned above, it is possible to prevent the pair of load transmitting members from being deformed in such a manner that the end portions of the pair of load transmitting members nearby the first housing are widened by the impact force transmitted to the pair of load transmitting members. Thus, it is possible to prevent the pair of load transmitting members from being damaged, which makes it possible to prevent the impact force from being transmitted to the second housing.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
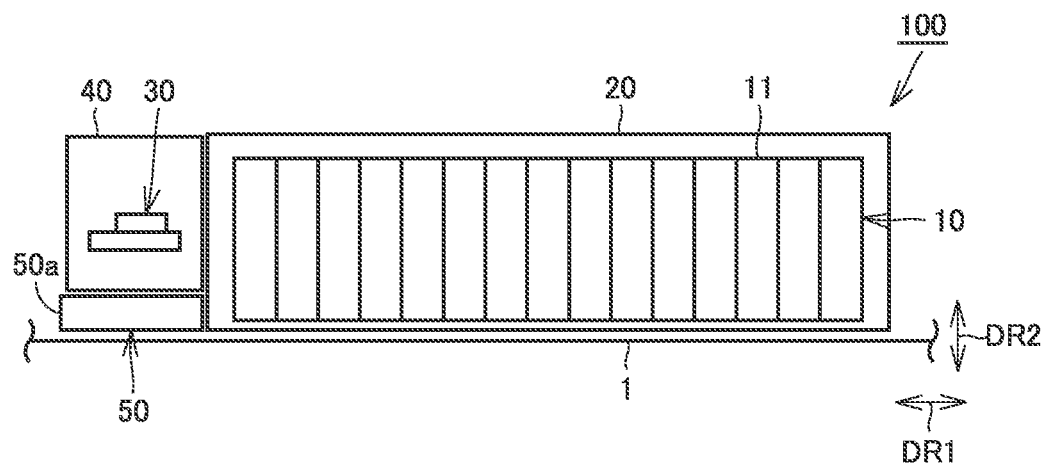
FIG. 1 is a schematic view illustrating a power storage device mounted on a vehicle according to an embodiment.

Hereinafter, an embodiment of the present disclosure will be described in detail with reference to the drawings. In the following embodiment, the same or equivalent portions in the drawings will be denoted by the same reference numerals, and the description thereof will not be repeated.

Embodiment

FIG. 1 is a schematic view illustrating a power storage device 100 mounted on a vehicle according to an embodiment. The power storage device 100 according to the present embodiment will be described with reference to FIG. 1.

The power storage device 100 according to the present embodiment is used in a vehicle such as a hybrid electric vehicle (HEV) provided with an engine and a motor generator as a power source or a battery electric vehicle (BEV) without an engine.

As illustrated in FIG. 1, the power storage device 100 is disposed above a floor panel 1, for example. The power storage device 100 may be disposed below the floor panel 1.

The power storage device 100 includes a power storage module 10, a first housing 20, an electronic device 30, a second housing 40, and a protection unit 50.

The power storage module 10 includes a plurality of power storage cells 11. The plurality of power storage cells 11 are disposed in a direction parallel to a first direction (DR1 direction) which will be described later. The plurality of power storage cells 11 are, for example, secondary batteries such as nickel-hydrogen batteries or lithium-ion batteries. The power storage cell 11 has, for example, a rectangular shape. The shape of the power storage cell 11 is not limited to a rectangular shape, and may be a cylindrical shape. The power storage cell 11 may be a power storage cell containing a liquid electrolyte or a power storage cell containing a solid electrolyte.

The power storage module 10 is housed in the first housing 20. The first housing 20 has a substantially rectangular parallelepiped shape. The first housing 20 is arranged side by side with the second housing 40 in the first direction (DR1 direction). The first direction is parallel to the width direction of the vehicle, for example, when the power storage device 100 is mounted on the vehicle. The first housing 20 is manufactured by, for example, aluminum die casting.

The electronic device 30 is, for example, a control ECU that controls the power storage module 10. The electronic device 30 is housed in the second housing 40. The electronic device 30 and the second housing 40 constitute a junction box, for example.

The second housing 40 has a substantially box shape. The second housing 40 is arranged side by side with the first housing 20. The second housing 40 is disposed on one side of the first housing 20 in the first direction. The second housing 40 may be disposed adjacent to the first housing 20 or with a gap between the first housing 20. The second housing 40 may be made of a metal material or a resin member.

The protection unit 50 protects the second housing 40. Specifically, when an impact force is applied from the first direction due to a side collision or the like of the vehicle, the protection unit 50 prevents the impact force from being transmitted to the second housing 40.

The protection unit 50 is disposed to overlap with the second housing 40 in a second direction (DR2 direction). The second direction is orthogonal to the first direction in which the first housing 20 and the second housing 40 are arranged side by side. The second direction is parallel to the vertical direction (perpendicular direction), for example.

The protection unit 50 is disposed below the second housing 40 and arranged side by side with the first housing 20. An end portion 50a of the protection unit 50 in the first direction is disposed to protrude from the second housing 40 in the first direction.

Figure 2:
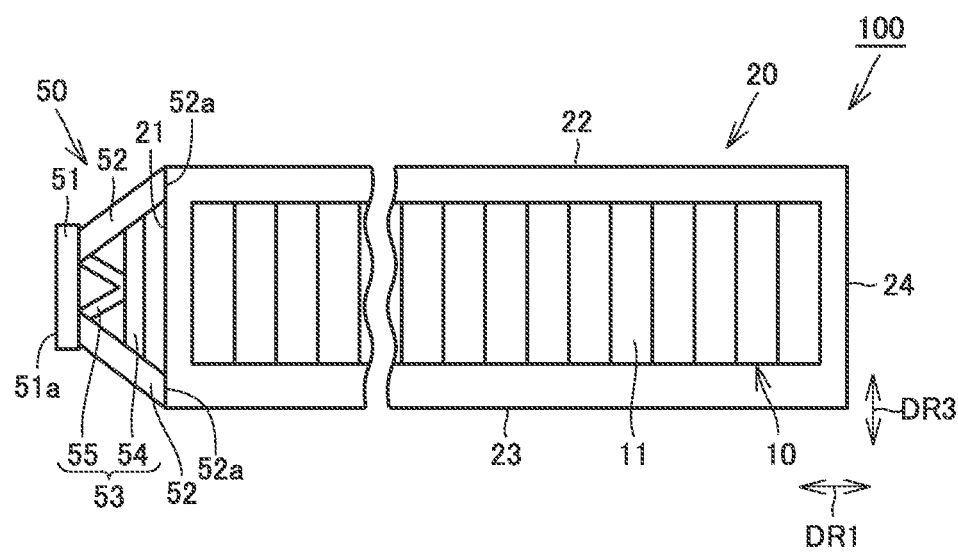
FIG. 2 is a plan view illustrating a protection unit and a first housing that houses a power storage module according to the present embodiment.

FIG. 2 is a plan view illustrating the protection unit and the first housing that houses the power storage module according to the present embodiment. The protection unit 50 will be described in detail with reference to FIG. 2.

The protection unit 50 includes a load receiving member 51, a pair of load transmitting members 52, and a reinforcing member 53. The load receiving member 51, the pair of load transmitting members 52 and the reinforcing member 53 are made of, for example, a metal material having impact resistance. The material of the load receiving member 51, the pair of load transmitting members 52 and the reinforcing member 53 is not limited to a metal material, and the material may be appropriately selected as long as it has a predetermined strength.

The load receiving member 51 has a substantially block shape. The load receiving member 51 extends in a third direction (DR3 direction) orthogonal to the first direction and the second direction. For example, the third direction is parallel to the front-rear direction of the vehicle when the power storage device 100 is mounted on the vehicle.

An end portion 51a (the end portion 50a) of the load receiving member 51 in the first direction is disposed to protrude from the second housing 40 in the first direction. Thus, when an impact force is applied from the first direction, the impact force is more reliably applied to the load receiving member 51.

The pair of load transmitting members 52 transmits the load applied to the load receiving member 51 to the first housing 20. The pair of load transmitting members 52 is connected between the load receiving member 51 and the first housing 20. The pair of load transmitting members 52 is disposed to face each other in the third direction. The pair of load transmitting members 52 is disposed in such a manner that a distance between the pair of load transmitting members 52 increases from the load receiving member 51 toward the first housing 20.

The first housing 20 has side surfaces 21, 22, 23 and 24. The side surfaces 21 and 24 face each other in the first direction. The side surface 21 faces the second housing 40 in the first direction. The side surfaces 22 and 23 face each other in the third direction. The side surface 22 is connect between an end portion of the side surface 21 and an end portion of the side surface 24 in the third direction. The side surface 23 is connect between the other end portion of the side surface 21 and the other end portion of the side surface 24 in the third direction.

As described above, since the side surfaces 22 and 23 are connected to both end portions of the side surface 21 in the third direction, the rigidity of both end portions of the side surface 21 is higher than that of the central portion of the side surface 21.

Each of the pair of load transmitting members 52 is connected to a corresponding one of both end portions of the side surface 21 in the third direction. When viewed from the second direction, a connection portion 52a of each of the pair of load transmitting members 52 connected to a corresponding one of both end portions of the side surface 21 is located outside the power storage module 10.

The reinforcing member 53 reinforces the pair of load transmitting members 52. The reinforcing member 53 includes a first connection member 54 and a second connection member 55. The first connection member 54 is configured to connect the pair of load transmitting members 52. The first connection member 54 extends in a direction parallel to the third direction so as to bridge the pair of load transmitting members 52.

The second connection member 55 has a substantially V-shape. Two arms of the V-shape are connected to the pair of load transmitting members 52, and the bottom of the V-shape is connected to the central portion of the first connection member 54.

When the vehicle encounters a side collision and an impact force is applied from the first direction, the impact force is applied to the load receiving member 51 of the protection unit 50. The impact force (load) applied to the load receiving member 51 is dispersed and transmitted to the first housing 20 by the pair of load transmitting members 52. As described above, the pair of load transmitting members 52 is reinforced by the reinforcing member 53. Thus, the pair of load transmitting members 52 is prevented from being damaged by the impact force. Therefore, it is possible for the pair of load transmitting members 52 to transmit the impact force to the first housing 20 while preventing the impact force from being transmitted to the second housing 40. Accordingly, it is possible to prevent the impact force from being transmitted to the electronic device 30 housed in the second housing 40.

Further, since the pair of load transmitting members 52 is disposed in such a manner that the distance between the pair of load transmitting members 52 increases toward the first housing 20, the impact force is transmitted to both end portions of the first housing 20 instead of the central portion thereof in the third direction. Since the rigidity of both end portions of the first housing 20 is higher than that of the central portion thereof, the first housing 20 is prevented from being deformed, which makes it possible to prevent the impact force from being transmitted to the power storage module 10.

In addition, as described above, the first housing 20 and the second housing 40 are arranged side by side. Therefore, as compared with the case where the power storage module 10 and the second housing 40 are arranged side by side inside the first housing 20, it is possible to reduce the physical size of the power storage device.

In other words, if the power storage module 10 and the second housing 40 are arranged side by side inside the first housing 20, it is necessary to provide a gap between the power storage module 10 and the second housing 40 and a gap between the second housing 40 and the side surface 21, which increases the length of the first housing 20 in the first direction.

Further, in the present embodiment, since the protection unit 50 is disposed to overlap with the second housing 40 in the second direction, it is possible to reduce the installation space of the protection unit 50 and the physical size of the power storage device 100.

As described above, it is possible to prevent the impact force from being transmitted to the power storage module 10 and the electronic device 30 while reducing the physical size of the power storage device 100 according to the present embodiment.

Further, according to the power storage device 100 of the present embodiment, as described above, since the rigidity of both end portions of the side surface 21 is higher, and each of the pair of load transmitting members 52 is connected to a corresponding one of both end portions of the side surface 21, it is possible to prevent the first housing 20 from being deformed. Accordingly, it is possible to prevent the first housing 20 from coming into contact with the power storage module 10, which makes it possible to further prevent the impact force from being transmitted to the power storage module 10.

In addition, as described above, since the connection portion of each of the pair of load transmitting members 52 connected to a corresponding one of both end portions of the side surface 21 is located outside the power storage module, even when the side surface is deformed, it is possible to prevent the side surface from coming into contact with the power storage module. Thus, it is possible to further prevent the impact force from being transmitted to the power storage module 10.

As illustrated in the following FIGS. 3 to 5, the protection unit 50 according to the present embodiment may be modified to a protection unit 50A according to a first modification, a protection unit 50B according to a second modification, or a protection unit 50C according to a third modification.

(First Modification)

Figure 3:
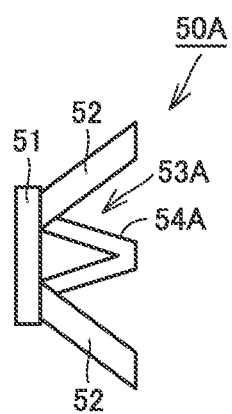
FIG. 3 is a plan view illustrating a protection unit according to a first modification.

FIG. 3 is a plan view illustrating a protection unit 50A according to a first modification. The protection unit 50A according to the first modification will be described with reference to FIG. 3.

As illustrated in FIG. 3, the protection unit 50A according to the first modification differs from the protection unit 50 according to the present embodiment in the structure of a reinforcing member 53A. The reinforcing member 53A includes only a first connection member 54A.

The first connection member 54A has a substantially V-shape. Two arms of the V-shape are disposed inside the pair of load transmitting members 52, and are respectively connected to the end portions of the pair of load transmitting members 52 nearby the load receiving member 51. The bottom of the V-shape is connected to the first housing 20. More specifically, the bottom of the V-shape is connected to the central portion of the side surface 21 in the third direction.

Even with the protection unit 50A according to the first modification, it is possible to obtain substantially the same effect as that of the present embodiment. In the first modification, the first connection member 54A also functions to transmit the load to the first housing 20, and the load is dispersed among the pair of load transmitting members 52 and the first connection member 54A.

(Second Modification)

Figure 4:
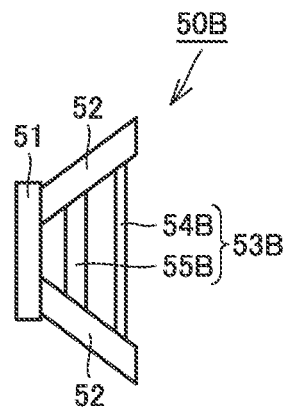
FIG. 4 is a plan view illustrating a protection unit according to a second modification.

FIG. 4 is a plan view illustrating a protection unit 50B according to a second modification. The protection unit 50B according to the second modification will be described with reference to FIG. 4.

As illustrated in FIG. 4, the protection unit 50B according to the second modification differs from the protection unit 50 according to the present embodiment in the structure of a reinforcing member 53B. The reinforcing member 53B includes a first connection member 54B and a second connection member 55B.

The first connection member 54B is disposed inside the pair of load transmitting members 52, and is connected to the end portions of the pair of load transmitting members 52 nearby the first housing 20. The second connection member 55B extends in a direction parallel to the third direction.

The second connection member 55B is disposed at a substantially central position between the first connection member 54B and the load receiving member 51. The second connection member 55B is disposed inside the pair of load transmitting members 52, and is connected to substantially the central portions of the pair of load transmitting members 52 in the extending direction of the load transmitting members 52. The width of the second connection member 55B in the first direction may be larger than the width of the first connection member 54B in the first direction.

Even with the protection unit 50B according to the second modification, it is possible to obtain substantially the same effect as that of the present embodiment.

(Third Modification)

Figure 5:
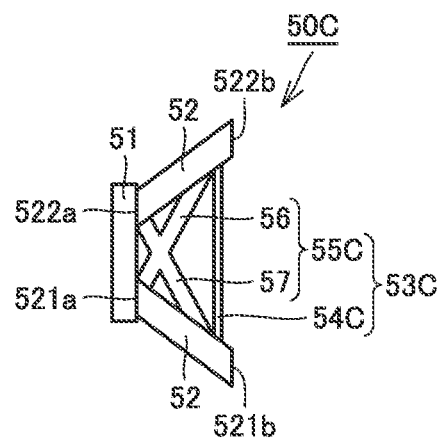
FIG. 5 is a plan view illustrating a protection unit according to a third modification.

FIG. 5 is a plan view illustrating a protection unit 50C according to a third modification. The protection unit 50C according to the third modification will be described with reference to FIG. 5.

As illustrated in FIG. 5, the protection unit 50C according to the third modification differs from the protection unit 50 according to the present embodiment in the structure of a reinforcing member 53C. The reinforcing member 53C includes a first connection member 54C and a second connection member 55C.

The first connection member 54C is disposed inside the pair of load transmitting members 52, and is connected to the end portions of the pair of load transmitting members 52 nearby the first housing 20. The second connection member 55C is disposed between the load receiving member 51 and the first connection member 54C. The second connection member 55C includes a first linear member 56 and a second linear member 57. The first linear member 56 and the second linear member 57 intersect with each other inside the pair of load transmitting members 52.

The first linear member 56 is connected to an end portion 521a of one load transmitting member 52 and an end portion 522b of the other load transmitting member 52. The end portion 521a is connected to the load receiving member 51, and the end portion 522b is connected to the first housing 20.

The second linear member 57 is connected to an end portion 522a of one load transmitting member 52 and an end portion 521b of the other load transmitting member 52. The end portion 522a is connected to the load receiving member 51, and the end portion 521b is connected to the first housing 20.

Even with the protection unit 50C according to the third modification, it is possible to obtain substantially the same effect as that of the present embodiment.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A power storage device comprising:
   a power storage module;
   a first housing that houses therein the power storage module;
   an electronic device;
   a second housing that is arranged side by side with the first housing and houses therein the electronic device; and
   a protection unit that protects the second housing,
   the protection unit being disposed to overlap with the second housing in a second direction orthogonal to a first direction in which the first housing and the second housing are arranged side by side,
   the protection unit including a load receiving member that receives a load applied from the first direction, a pair of load transmitting members connected between the load receiving member and the first housing so as to transmit the load applied to the load receiving member to the first housing, and a reinforcing member that reinforces the pair of load transmitting members,
   the pair of load transmitting members being disposed other in a third direction orthogonal to the first direction and the second direction in such a manner that a distance between the pair of load transmitting members increases from the load receiving member toward the first housing, the reinforcing member including a first connection member and a second connection member to connect the pair of load transmitting members, the first connection member extending in a direction parallel to the third direction so as to bridge the pair of load transmitting members, and the second connection member being disposed so as to form a gap between the load receiving member and the first connection member.

2. The power storage device according to claim 1, wherein when viewed from the second direction, the load receiving member is disposed to protrude from the second housing in the first direction.

3. The power storage device according to claim 1, wherein the first housing includes a side surface facing the second housing in the first direction, and each of the pair of load transmitting members is connected to a corresponding one of both end portions of the side surface in the third direction.

4. The power storage device according to claim 3, wherein when viewed from the second direction, a connection portion of each of the pair of load transmitting members connected to a corresponding one of both end portions of the side surface is located outside the power storage module.

5. The power storage device according to claim 1, wherein the second connection member has a V-shape, two arms of the V-shape are connected to the pair of load transmitting members, and a bottom of the V-shape is connected to a central portion of the first connection member.

6. The power storage device according to claim 1, wherein the second connection member has a first linear member and a second linear member intersecting with each other inside the pair of load transmitting members.

7. The power storage device according to claim 1, wherein the second connection member is connected to the central portions of the pair of load transmitting members in an extending direction of the load transmitting members.

* * * * *